United States Patent [19]

Bellettato

[11] Patent Number: 5,401,160
[45] Date of Patent: Mar. 28, 1995

[54] DEVICE FOR LOADING PLASTIC SHEET MATERIAL INTO THE MOLD OF A MOLDING PRESS

[75] Inventor: Bruno Bellettato, Cirie', Italy
[73] Assignee: Iveco Fiat S.p.A., Italy
[21] Appl. No.: 122,334
[22] Filed: Sep. 17, 1993
[30] Foreign Application Priority Data Sep. 18, 1992 [IT] Italy ................ TO92A0775

[51] Int. Cl.6 ................ B29C 31/08; B65G 47/34
[52] U.S. Cl. ................ 425/397; 198/463.3; 198/468.8; 414/19
[58] Field of Search ........... 414/19, 749; 198/463.3, 198/468.8, 602, 608; 271/264; 425/383, 394, 397, 126.1

[56] References Cited

U.S. PATENT DOCUMENTS

| | | | |
|---|---|---|---|
| 3,483,802 | 12/1969 | Heyne | 198/468.8 |
| 4,015,872 | 4/1977 | Loznak et al. | 294/61 |
| 4,750,605 | 6/1988 | Brems et al. | 198/468.8 |

FOREIGN PATENT DOCUMENTS

| | | | |
|---|---|---|---|
| 0282700 | 9/1988 | European Pat. Off. | |
| 2637835 | 4/1990 | France | |
| 3021212 | 1/1981 | Germany | 198/463.3 |
| 1135430 | 12/1968 | United Kingdom | |
| WO86/6356 | 11/1986 | WIPO | 198/468.8 |

*Primary Examiner*—Jay H. Woo
*Assistant Examiner*—Robert B. Davis
*Attorney, Agent, or Firm*—Myers, Liniak & Berenato

[57] ABSTRACT

A load of plastic material, including two sheets cut successively from a strip, is loaded into the mold of a molding press by way of a loading device including a conveyor having a number of spaced, parallel belts; a number of lifting elements arranged in rows between the belts; and a number of retractable bars insertable between the lifting elements for picking up the load. By way of an operating arm, the bars are moved up to the mold and then withdrawn in relation to a stop cross member so as to drop the load inside the mold.

8 Claims, 4 Drawing Sheets

DEVICE FOR LOADING PLASTIC SHEET MATERIAL INTO THE MOLD OF A MOLDING PRESS

BACKGROUND OF THE INVENTION

The present invention relates to a device for loading plastic sheet material into the mold of a molding press. A common practice nowadays in the vehicle body component industry is to mold parts from plastic sheet material, such as heat-setting fiberglass-reinforced polyester resin known as SMC, which is usually supplied in rolls. For each production part, the press is loaded with a number of sheets cut off the roll, and the size of which must correspond accurately to the part being produced. Normally, each load consists of at least two sheets, which must be loaded in a predetermined mutual position on a conveyor, from which they are subsequently transferred to the mold.

On known molding systems, the load is usually transferred using hand-operated fixtures, so that accurate positioning of the load inside the mold is not only time-consuming but also dangerous in terms of the safety of the operator.

SUMMARY OF THE INVENTION

It is an object of the present invention to provide an efficient, reliable device for loading plastic material into the mold of a molding press, designed to overcome the aforementioned drawbacks.

According to the present invention, there is provided a device for loading plastic sheet material into the mold of a molding press, said device comprising a conveyor for feeding said load of plastic material into a position adjacent to said mold; characterised by the fact that said conveyor comprises a number of spaced, parallel, horizontally-mobile transportation elements; a number of vertically-mobile lifting elements being provided in the gaps between said transportation elements, for removing said load off said transportation elements; and means being provided for transferring said load off said lifting elements and into said mold.

BRIEF DESCRIPTION OF THE DRAWINGS

A preferred, non-limiting embodiment of the present invention will be described by way of example with reference to the accompanying drawings, in which:

FIG. 10 shows a table of the operating stages of the device.

DETAILED DESCRIPTION OF THE INVENTION

Figure 1:
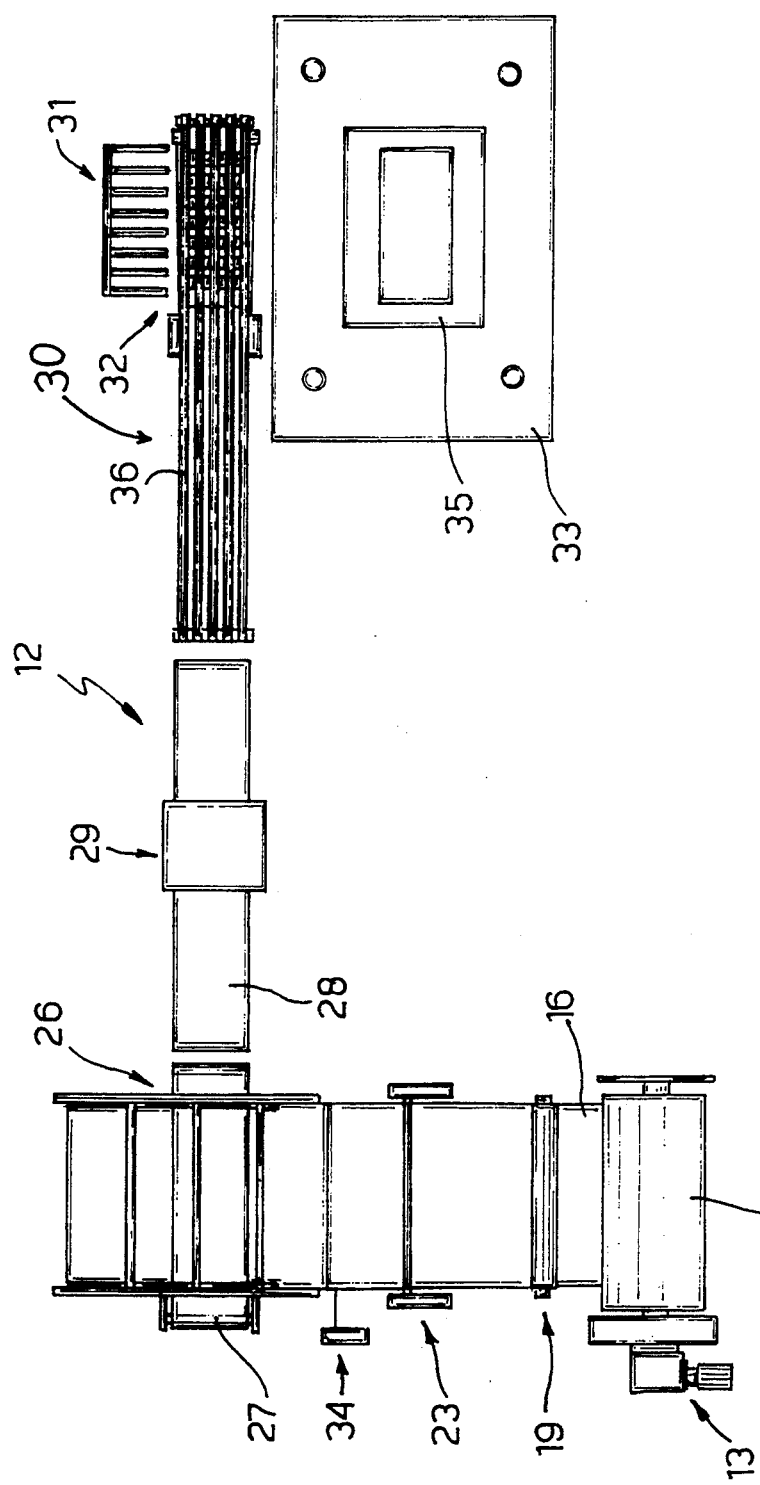
FIG. 1 shows a schematic plan view of a molding system comprising a loading device in accordance with the present invention.

Number 12 in FIG. 1 indicates an automatic vehicle body component manufacturing system comprising a loading station 13 equipped with a roll 14 of plastic strip material 16, e.g. fiberglass-reinforced polyester resin known as SMC. Strip 16 of SMC is supplied in two protective polyester films, which are removed in station 19.

System 12 also comprises a station 23 for cutting strip 16 into sheets 24 and 24' (FIG. 2); a station 34 for weighing sheets 24 and 24'; and a device 26 for transferring sheets 24 and 24' on to a first conveyor belt 27, on which sheets 24 and 24' are loaded in a predetermined mutual position to form the load 25 of material required for a given production part. Conveyor 27 feeds load 25 on to a second conveyor belt 28 by which it is fed to a preheat station 29 where sheets 24 and 24' are heated, without being distorted, to a given temperature.

From preheat station 29, a third conveyor 30 feeds load 25 to a loading station 31 featuring a loading device 32, which includes conveyor 30, and is governed by a control unit for feeding load 25 into the mold 35 of a molding press 33.

According to the present invention, conveyor 30 comprises a number of parallel looped belts 36 (FIG. 1) powered by pulleys 37 so as to transport load 25 in a horizontal direction, and each separated from the adjacent belt 36 by a gap 38.

Loading device 32 also comprises a number of lifting elements, each consisting of a vertical rod 39 fitted on the top end with a pad 41. Pads 41 and respective rods 39 are arranged in horizontal rows 42 and columns 43, each row 42 being located in a respective gap 38 between two adjacent belts 36, and columns 43 being separated by gaps 44 perpendicular to gaps 38.

Rods 39 are fitted to a common vertically-mobile base 46 operated, for example, by an actuator comprising a pinion 47 engaging a rack 48 secured to base 46. Base 46 is normally maintained in the lowered position shown in FIGS. 2 and 5, wherein pads 41 are positioned beneath the supporting surface of load 25. When base 46 is raised, as shown in FIG. 3, pads 41 engage load 25 on belts 36, so as to lift it off the supporting surface.

Figure 3:
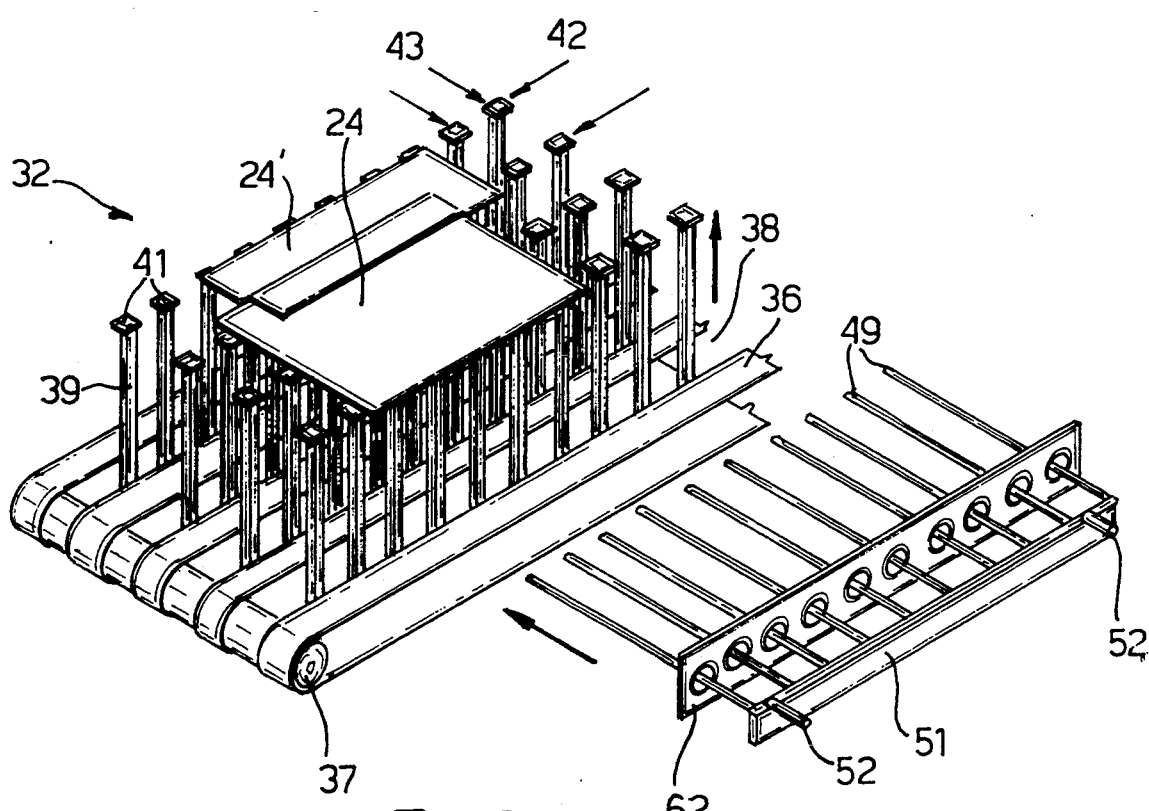
FIG. 3 shows a further part view in perspective of the loading device in a different operating position.
Figure 4:
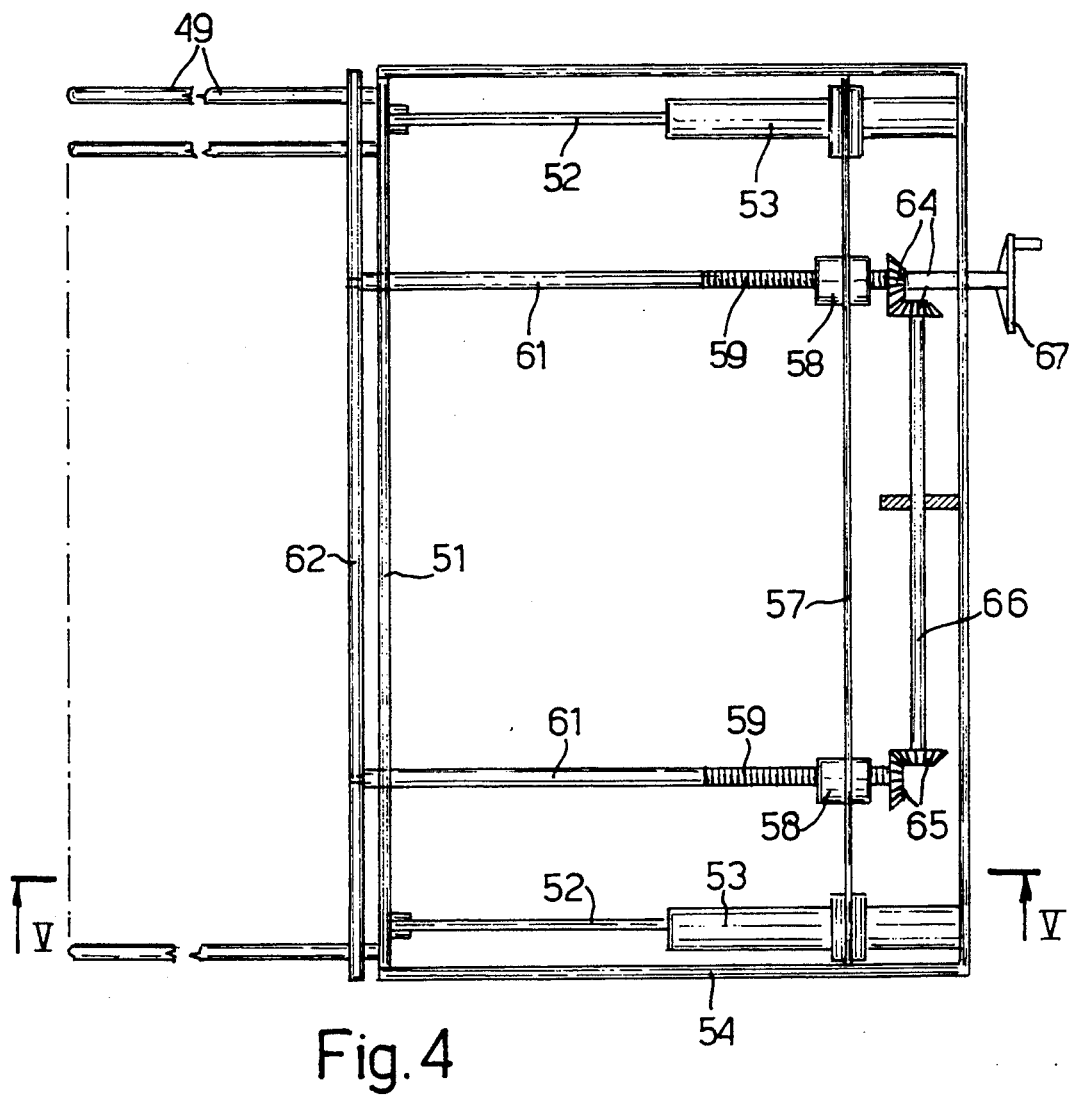
FIG. 4 shows a larger-scale partial plan view of the loading device.

Loading device 32 also comprises means for transferring load 25 from pads 41 to mold 35, said means comprising a number of retractable bars or fingers 49 (FIG. 4) supported on a cross member 51 and normally positioned in a horizontal plane over belts 36. Bars 49 are positioned beneath pads 41, when these are raised as shown by the dotted line in FIG. 5, and are aligned with gaps 44 of columns 43 of rods 39 (FIG. 3).

Cross member 51 (FIGS. 4 and 5) is connected to two horizontal rods 52 operated by respective pneumatic linear actuators 53 fitted to a frame 54 on the operating arm 56 of a robot. Arm 56 is moved in known manner from the withdrawn position shown in FIG. 5, wherein cross member 51 is adjacent to belts 36, to the FIG. 7 position wherein cross member 51 is adjacent to mold 35.

Frame 54 also comprises a cross member 57 fitted with two nut screws 58 cooperating with two screw portions 59 of two cylindrical bars 61 mounted for rotation on a cross member 62 for arresting the edge of the load consisting of sheets 24 and 24'. Cross member 62 presents a number of holes 63 in which bars 49 are guided in sliding manner. Cylindrical bars 61 are connected to each other by two pairs of bevel gears 64, 65 and a transverse shaft 66, and are rotated simultaneously by a handwheel 67.

Operation of loading device 32 will be described with the aid of the FIG. 10 table.

Figure 2:
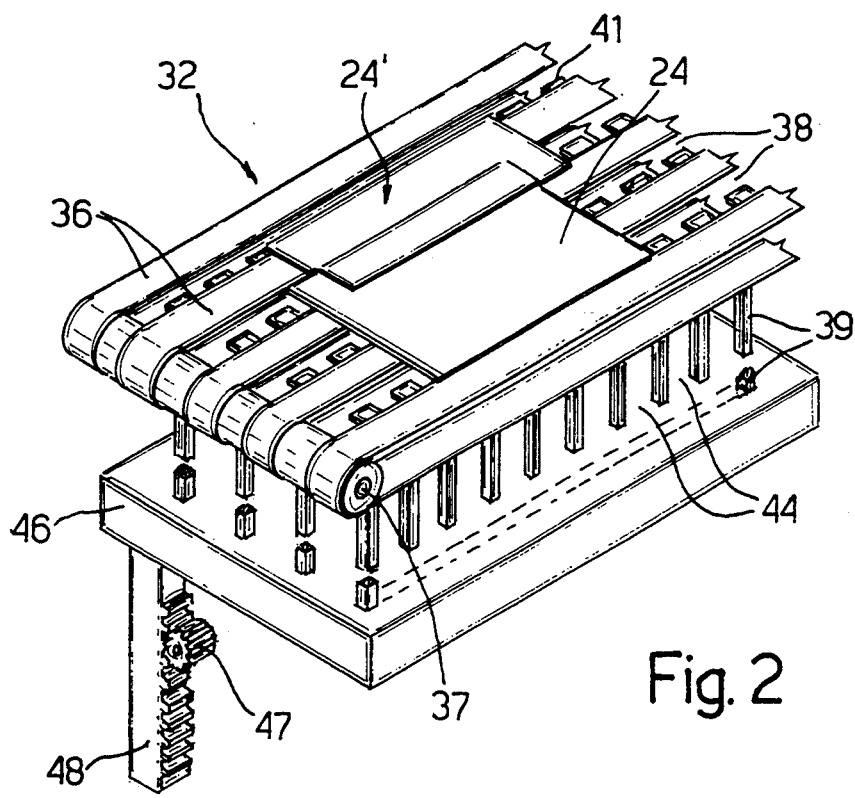
FIG. 2 shows a part view in perspective of the loading device.
Figure 5:
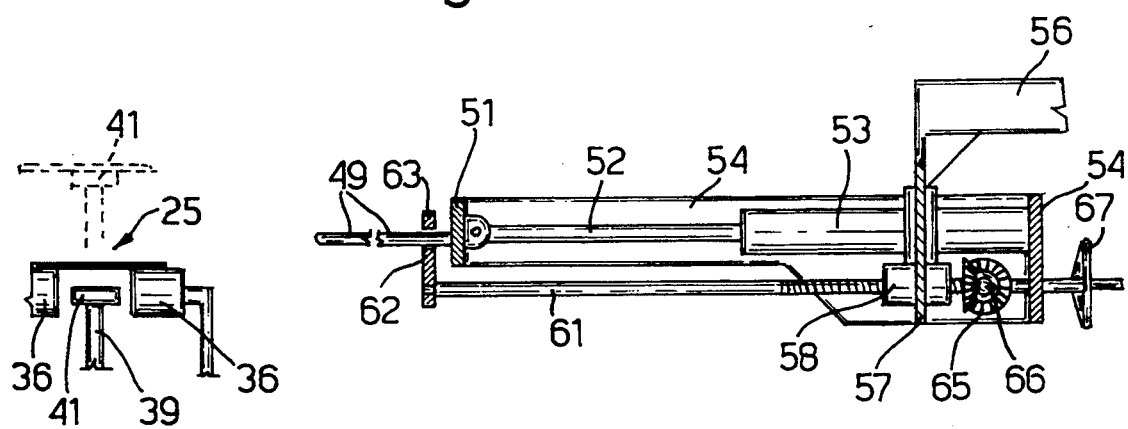
FIG. 5 shows a section along line V—V in FIG. 4, in the idle position.
Figure 7:
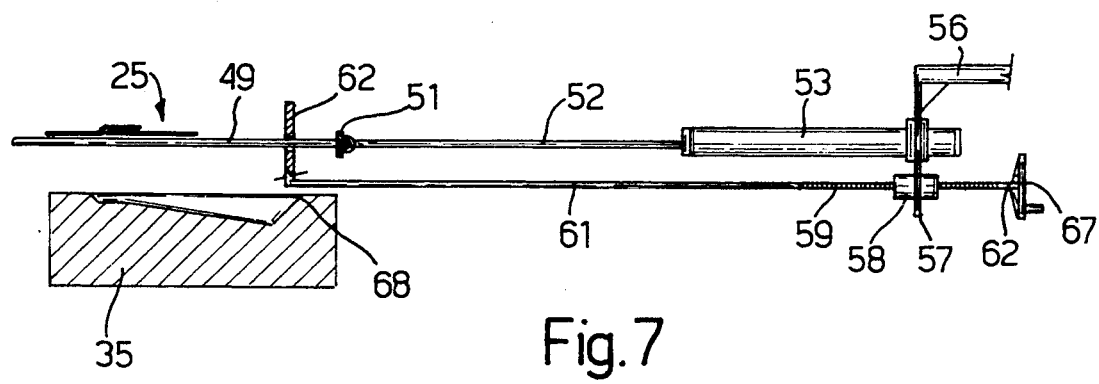
Figure 8:
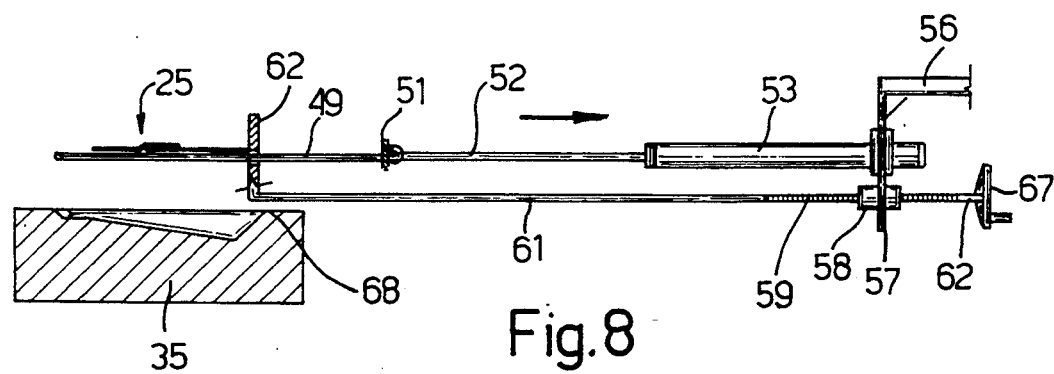
Figure 9:
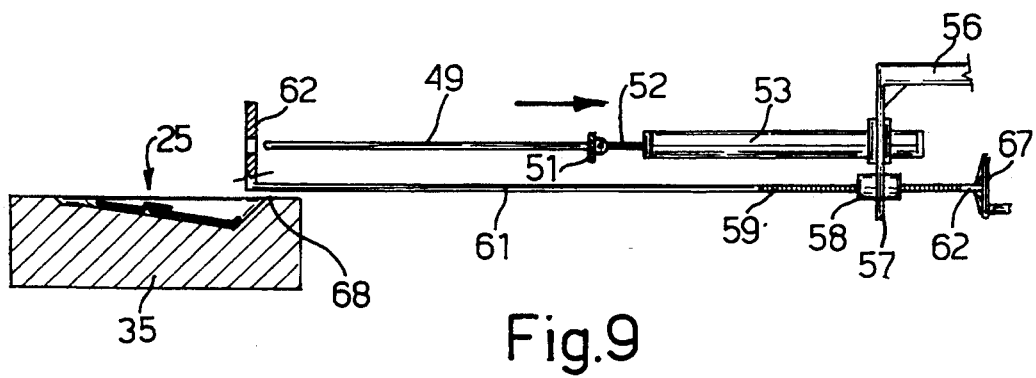

When load 25 of sheets 24, 24' is positioned on belts 36 in station 31 (FIG. 1) ready for transfer into mold 35, arm 56 is positioned as shown in FIG. 5; bars 49 are withdrawn by actuators 53; pads 41 on base 46 are lowered as shown in FIG. 2; and, by means of handwheel 67, stop cross member 62 is so positioned that, when arm 56 is set to the FIG. 7–9 position, cross member 62 corresponds with the edge 68 of mold 35.

Figure 6:
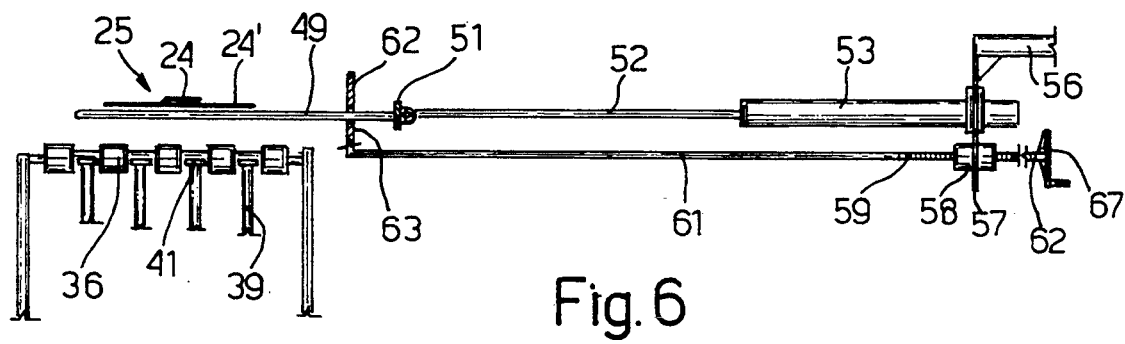
FIGS. 6–9 show schematic views of the FIG. 5 section in various operating positions.

FIG. 10 shows the various stages of operations in the actual transfer of load 25 into mold 35, which consist in a pickup operation 69 wherein pinion 47 (FIG. 2) raises base 46 to position rods 39 and pads 41 as shown in FIG. 3 and so raise load 25; an operation 71 wherein actuators 53 move cross member 51 towards belts 36, so as to insert bars 49 inside gaps 44 between columns 43 of rods 39; an operation 72 wherein pinion 47 (FIG. 2) lowers base 46 together with pads 41, thus leaving load 25 resting on bars 49 as shown in FIG. 6; an operation 73 wherein arm 56 is moved leftwards to bring frame 54 up to mold 35 as shown in FIG. 7; and, finally, an operation 74 wherein actuators 53 withdraw bars 49 while cross member 62 remains stationary. When the edge of load 25 engages cross member 62, as shown in FIG. 8, load 25 is arrested, and, as bars 49 are withdrawn by actuators 53, slides along bars 49 so as to drop down inside mold 35, as shown in FIG. 9, at which point, arm 56 is restored to the FIG. 5 position.

The advantages of the device according to the present invention will be clear from the foregoing description. In particular, it provides for transferring load 25 fully automatically by means of robot arm 56, so that the operator need no longer work between the two halves of the mold on the press. Moreover, it provides for highly straightforward transfer of load 25 from belts 36 to retractable bars 49 and from these to mold 35, thus ensuring accurate positioning of load 25 and, consequently, consistent, good quality production parts. To those skilled in the art it will be clear that changes may be made to the method and equipment described and illustrated herein without, however, departing from the scope of the present invention. For example, changes may be made to the design of pads 41 or frame 54 supporting bars 49.

I claim:

1. A device for loading plastic sheet material into a mold of a molding press, said device comprising a conveyor for feeding a load of plastic material into a position adjacent to said mold; wherein said conveyor comprises a number of spaced, parallel, horizontally-mobile transportation elements having gaps therebetween; a number of vertically-mobile lifting elements being provided in the gaps between said transportation elements, for removing said load off of said transportation elements; and means being provided for transferring said load off of said lifting elements and into said mold; and wherein said transportation elements comprise parallel, simultaneously-moving looped belts; each gap between said belts housing a row of said lifting elements.

2. A device as claimed in claim 1, wherein each said lifting element (39, 41) comprises a pad (41) fitted to the top end of a vertical rod (39); said rods (39) being arranged in horizontal rows (42) and columns (43), and being supported on a common vertically-mobile base (46).

3. A device as claimed in claim 2, wherein said transfer means (49, 62) comprise a number of spaced, coplanar, horizontal bars (49) located over and perpendicular to the traveling direction of said belts (36), and insertable between said columns (43) of said rods (39).

4. A device as claimed in claim 3, wherein said transfer means (49, 62) further comprise stop means (62) for arresting said load (25), said stop means being positionable as to transfer said load (25) into said mold (35) by displacing said bars (9) in relation to said stop means (62).

5. A device as claimed in claim 4, wherein said stop means comprise a cross member (62) with holes for guiding said bars (49) in a sliding manner; said cross member (62) and said bars (49) being mounted on a frame (54) designed to move between a position adjacent to said belts (36) and a position adjacent to said mold (35).

6. A device as claimed in claim 5, wherein said frame (54) is moveable by an operating member (56); said bars (49) on said frame being moved in relation to said cross member (62) by an actuating member (53).

7. A device as claimed in claim 5, further comprising means (67) for moving said cross member (62) so that the position of said cross member corresponds with an edge of said mold.

8. An apparatus for loading plastic sheet material into a mold of a molding press, the apparatus comprising:
   a conveyor for moving a load of plastic material into a position adjacent said mold of said molding press, said conveyor including a plurality of substantially parallel simultaneously moving looped belts;
   a plurality of vertically moveable lifting elements disposed in gaps defined between said plurality of looped belts, said lifting elements for moving the load from said looped belts so that the load can be transferred into said mold; and
   wherein a plurality of said lifting elements is disposed in each of said gaps defined between said looped belts whereby said lifting elements in said gaps are moveable relative to said belts so as to remove said load from said belts.

* * * * *